United States Patent Office 2,884,772
Patented May 5, 1959

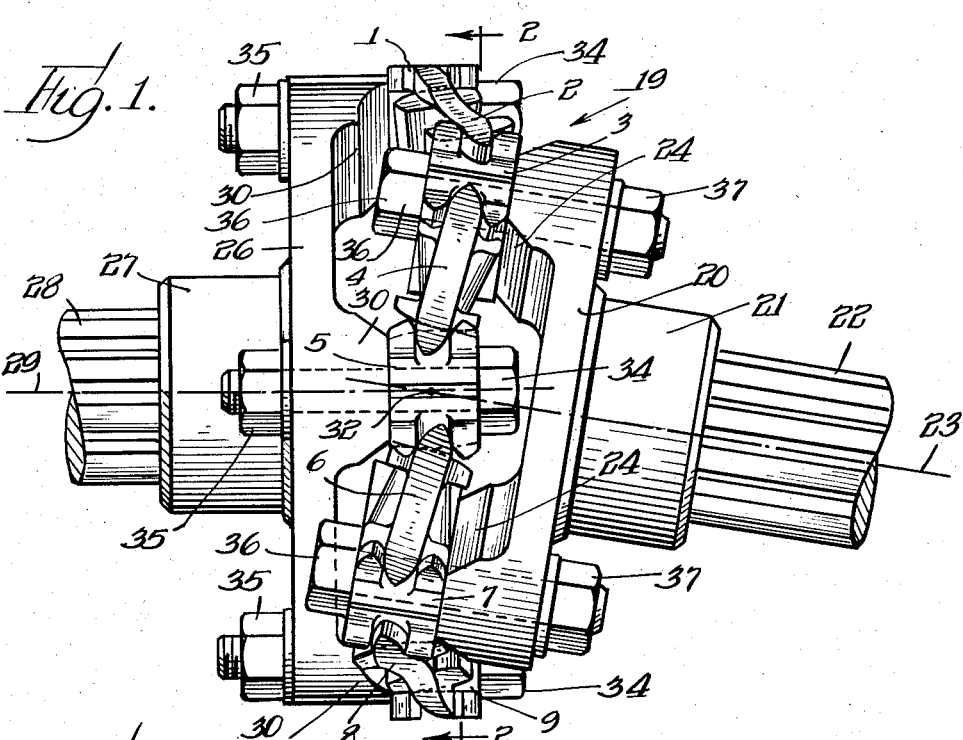

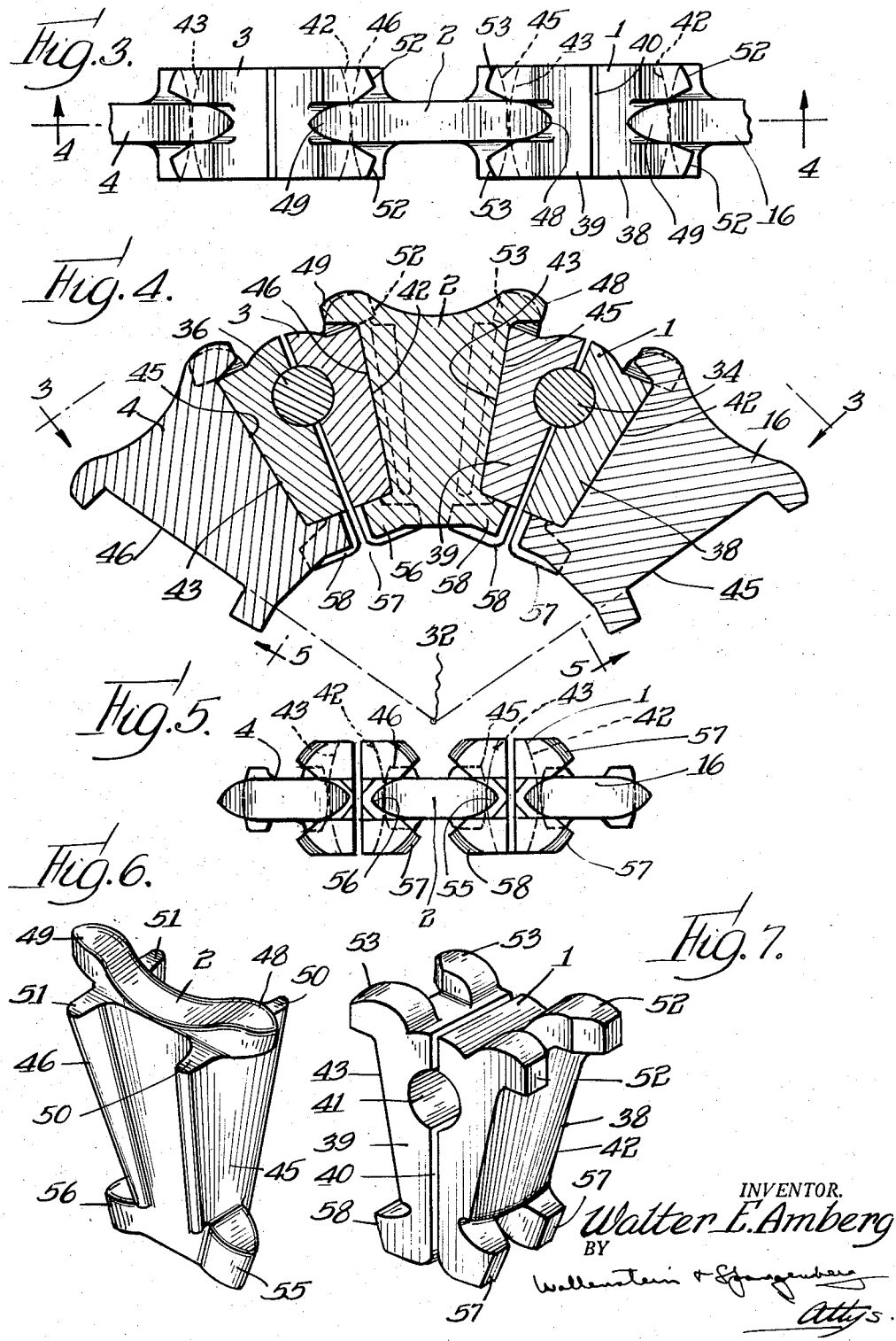

2,884,772

ROTARY TORQUE TRANSMITTING JOINT

Walter E. Amberg, Chicago, Ill.

Application April 10, 1956, Serial No. 577,219

20 Claims. (Cl. 64—21)

The principal object of this invention is to provide a new rotary torque transmitting joint for transmitting high torque between a pair of rotating members, wherein the torque transmitted between them remains substantially uniform or constant, wherein the angular velocity of the driven member remains substantially uniform or constant with that of the driving member, wherein relatively slidable parts are eliminated so that lubrication of the joint is not necessary, wherein relative movement of the parts takes the form of rocking movement, wherein high torque is transmitted at maximum efficiency, and wherein the axes of rotation of the rotating members are automatically maintained in intersecting position without any danger of whipping or oscillation of the joint.

Briefly, the rotary torque transmitting joint of this invention, for transmitting high torque at substantially constant angular velocity between a driving member rotating about an axis and an adjacent driven member rotating about an axis which intersects the axis of rotation of the driving member, includes a plurality of torque transmitting rockers which are circumferentially arranged substantially in a torque transmitting plane between the driving and driven members, and which have their adjacent sides rockingly contacting each other. A first group of said rockers, one-fourth of the total number, are secured in circumferentially spaced-apart relation to the driving member to form driving captive rockers and a second group of said rockers, one-fourth of the total number, are secured in circumferentially spaced-apart relation to the driven member to form driven captive rockers. A third group of said rockers, the remaining one-half of the total number, are individually arranged between the driving and driven captive rockers to form floating rockers for transmitting torque from the driving captive rockers to the driven captive rockers. The rockers rockingly contact each other along lines of contact which radiate from the point of intersection of the axes of rotation of the driving and driven members so as to provide a true rocking relation therebetween. Because of this arrangement, the axes of rotation of the rotating members are automatically maintained in intersecting position without any danger of whipping or oscillation of the joint and at the same time high torque is transmitted at substantially constant velocity and at substantially constant torque. Intermeshing means are provided on the captive and floating rockers for maintaining the rockers in rocking contact and they also operate to prevent radial displacement of the floating rockers with respect to the captive rockers. More specifically, the contacting sides of the rockers are apically tapered from the point of intersection of the axes of rotation of the driving and driven members and are contoured to provide at all times rocking contact therebetween along lines of contact radiating from said point of intersection. At least some of the rockers, preferably the captive rockers, are adjustable in their circumferential dimension for assuring rocking contact between all of the rockers.

Further objects of this invention reside in the details of construction of the rotary torque transmitting joint and in the co-operative relationships between the component parts thereof.

Other objects and advantages of this invention will become apparent to those skilled in the art upon reference to the accompanying specification, claims and drawings, in which:

Fig. 1 is a side elevational view of the rotary torque transmitting joint of this invention, showing the rotating axes of the driving and driven members angularly displaced and intersecting at a central point in the joint.

Fig. 2 is a sectional view through the rotary torque transmitting joint taken substantially along the line 2—2 of Fig. 1.

Fig. 3 is an extended top plan view of a portion of the joint looking from the top of Fig. 1, and from the line 3—3 of Fig. 4.

Fig. 4 is a sectional view taken substantially along the line 4—4 of Fig. 3.

Fig. 5 is a bottom plan view of a portion of the torque transmitting joint looking from the line 5—5 of Fig. 4.

Fig. 6 is a perspective view of one of the floating rockers.

Fig. 7 is a perspective view of one of the captive rockers.

Referring first to Figs. 1 and 2, the rotary torque transmitting joint of this invention is generally designated at 19 and it is utilized for joining together in universal fashion a pair of shafts 22 and 28. The rotary torque transmitting joint includes a driven member 20 having a hub 21 which may be splined onto the end of the shaft 22, the driven member 20 and shaft 22 rotating about an axis of rotation 23. The driven member 20 is provided with a plurality of longitudinally extending ears 24, four of such ears being shown for purposes of illustration.

The rotary torque transmitting joint also includes a driving member 26 provided with a hub 27 which is splined to the end of the driving shaft 28, the driving member 26 and shaft 28 rotating about an axis of rotation 29. The driving member 26 is also provided with a plurality of longitudinally extending ears 30, four of such ears being shown for purposes of illustration. The axes of rotation 23 and 29 of the driven and driving members 20 and 26 intersect at a point 32 therebetween and this point 32 of intersection remains fixed regardless of the angular displacement between the axes of rotation 23 and 29.

A plurality of torque transmitting rockers are circumferentially arranged substantially in a torque transmitting plane between the driving and driven members 26 and 20 and they have their adjacent sides rockingly contacting each other. For purposes of illustration here, 16 such rockers are shown, they being numbered 1-16, respectively. A first group of said rockers, one-fourth of the total number of rockers, are secured to the ears 30 of the driving member 26. In this respect, rockers 1, 5, 9 and 13 are secured by bolts 34 and nuts 35 to the ears 30 and they form driving captive rockers. A second group of rockers, also consisting of one-fourth of the total number of rockers, are secured to the ears 24 of the driven member 20 and, as illustrated, they consist of rockers 3, 7, 11 and 15 secured by bolts 36 and nuts 37 to the ears 34. This second group of rockers 3, 7, 11 and 15 form driven captive rockers. The remaining rockers, one-half of the total number of rockers, form a third group of floating rockers, these floating rockers being individually arranged between the respective driving and driven captive rockers, floating rocker 2 being arranged between captive rockers 1 and 3, floating rocker 4 being arranged between captive rockers 3 and 5, floating rocker 6 being arranged between captice rockers 5 and 7, floating rocker 8 being arranged between captive rockers 7 and 9, floating rocker 10 being arranged between captive rockers 9 and 11, floating rocker 12 being arranged between captive rockers 11 and 13, floating rocker 14 being arranged between captive rockers 13 and 15, and floating rocker 16 being arranged between captive rockers 15 and 1. These floating rockers which rockingly contact their adjacent captive rockers, operate to transmit torque from the driving captive rockers to the driven captive rockers and, hence, from the driving member 26 to the driven member 20. While sixteen rockers have been shown for purposes of illustration, other members of rockers may be utilized so long as rocking contact between the floating and captive rockers is at all times maintained.

All of the captive rockers may be of similar construction, which construction is shown in more detail in Fig. 7. Here, the captive rocker 1 is preferably formed in two halves 38 and 39, so as to provide a slight clearance 40 therebetween. The two halves 38 and 39 are provided with adjacent recesses to form a central hole 41 when the two halves are brought adjacent each other. The bolts 34 and 36 for securing the captive rockers to the driving and driven members 26 and 20, extend through these holes 41. The purpose of making the captive rockers in two parts is to make them adjustable in the circumferential direction so that when all of the rockers are circumferentially arranged between the driving and driven members, there will be rocking contact between each rocker. The two parts of the captive rockers may be adjusted by shimming them apart by means of using bolts 34 and 36 of desired diameters or by using flat shims between the two parts. While the captive rockers are shown as being made in two parts, the floating rockers could be made in two parts also, if so desired. The sides 42 and 43, of the captive rocker 1, are preferably apically tapered from the point of intersection 32 of the axes of rotation 29 and 23 of the driving and driven members.

The floating rockers may also be of identical construction and they are shown in detail in Fig. 6. Here, the floating rocker 2 has extended sides 45 and 46, which are also preferably apically tapered from the point of intersection 32 of the axes of rotation 29 and 23 of the driving and driven members. The sides 42 and 43 of the captive rockers and the sides 45 and 46 of the floating rockers, in addition to being apically tapered, are also so contoured to provide at all times rocking contact therebetween along lines of contact radiating from the point of intersection 32 of the axes of rotation 29 and 23 of the driving and driven members. Towards the center of the sides of the rockers, the radii of curvature are greater than the radii of curvature toward the edges of the sides so that as the floating rockers are rocked out of a true plane, as shown in Fig. 1, they will at all times, have rocking contact along lines of contact radiating from said point of intersection 32. Because of this true rocking contact between the captive and floating rockers at all times, the rotary torque is transmitted from the driving member to the driven member at substantially constant velocity with substantially constant force.

The outer parts of the floating rockers are provided with a pair of teeth 48 and 49 adjacent the sides 45 and 46, and the sides 45 and 46 form shoulders 50 and 51 adjacent the teeth 48 and 49. The outer parts of the captive rockers are provided with two pairs of teeth 52 and 53 adjacent the sides 42 and 43, respectively, thereof. The teeth 48 and 49 on the captive rocker intermesh with the teeth 53 and 52 on the captive rockers, and the teeth 52 and 53 on the captive rockers overlie the shoulders 51 and 50 on the floating rockers. The inner parts of the floating rockers are provided with teeth 55 and 56 adjacent the sides 45 and 46, and the inner parts of the captive rockers are provided with two pairs of teeth 57 and 58 adjacent the sides 42 and 43 thereof. The teeth 55 and 56 on the floating rockers intermesh with the teeth 58 and 57 on the captive rockers, and the teeth 55 and 56 of the floating rockers extend under the sides 42 and 43 of the captive rockers between the teeth 58 and 57. The teeth 48, 49, 55 and 56 on the floating rockers, which intermesh with the teeth 53, 52, 58 and 57 on the captive rockers, operate at all times to maintain the floating rockers in correct position with respect to the captive rockers so as to assure proper rocking contact between the floating and captive rockers along lines radiating from the point of intersection 32 of the axes of rotation 29 and 23 of the driving and driven members. In other words, these intermeshing teeth perform the function of maintaining proper alignment between the floating and captive rockers and to prevent tilting thereof with respect to each other. Since the shoulders 50 and 51 of the floating rockers engage under the teeth 53 and 52 of the captive rockers, and since the teeth 55 and 56 of the floating rockers engage under the sides 43 and 42 of the captive rockers between the teeth 58 and 57 thereof, radial displacement in an outward direction of the floating rockers, with respect to the captive rockers, is prevented. The teeth 48 and 49 of the floating rockers also engage over the sides 43 and 42 of the captive rockers to prevent radial displacement of the floating rockers inwardly with respect to the captive rockers. In this way, the floating rockers are maintained in correct position between the captive rockers, radial displacement of the floating rockers being prevented, and proper alignment of the floating rockers, with respect to the captive rockers for true rocking engagement therebetween, being assured. While the intermeshing of the teeth and the shoulders on the floating and captive rockers effectively operate to prevent radial displacement of the floating rockers, which might be brought about by centrifugal force, other means may be utilized for this purpose. For example, diametrically opposed floating rockers may be mechanically coupled together, as for example, floating rocker 2 being coupled to floating rocker 10, floating rocker 4 being coupled to floating rocker 12 and the like. This direct mechanical coupling may be resorted to, if desired, since there is no mechanism at the center of the joint to interfere therewith.

Because there is at all times true rocking contact between the floating and captive rockers, torque is transmitted at substantially constant velocity with substantially constant force and since the floating rockers are at all times maintained in proper position with respect to the captive rockers, the axes of rotation 29 and 23 of the driving and driven member will always intersect at 32, regardless of the angularity between the axes of rotation, within the angularity limits of the joint. Thus, there is no need for extraneous devices for maintaining the intersecting point fixed, this being automatically accomplished by the rotary torque transmitting joint of this invention.

While for purposes of illustration, one form of this invention has been disclosed, other forms thereof may become apparent to those skilled in the art upon reference to this disclosure and, therefore, this invention is to be limited only by the scope of the appended claims.

I claim as my invention:

1. A rotary torque transmitting joint for transmitting high torque at substantially constant angular velocity between a driving member rotating about an axis and an adjacent driven member rotating about an axis which intersects the axis of rotation of the driving member comprising, a plurality of substantially equally radially spaced torque transmitting rockers circumferentially arranged substantially in a torque transmitting plane between the driving and driven members and having their adjacent sides rockingly contacting each other, means securing a first group of said rockers in circumferentially spaced apart relation to the driving member to form driving captive rockers, means securing a second group of said rockers in circumferentially spaced apart relation to the driven member to form driven captive rockers, the remainder of said rockers forming a third group of floating rockers which are individually arranged between the respective driving and driven captive rockers for transmitting torque from the former to the latter.

2. A rotary torque transmitting joint for transmitting high torque at substantially constant angular velocity between a driving member rotating about an axis and an adjacent driven member rotating about an axis which intersects the axis of rotation of the driving member comprising, a first group of rockers secured in circumferentially spaced apart relation to the driving member and forming driving captive rockers, a second group of rockers secured in circumferentially spaced apart relation to the driven member and forming driven captive rockers, a third group of rockers arranged in circumferentially spaced apart relation and interposed between the first and second groups of rockers and forming floating rockers, all of said rockers being substantially equally radially spaced and circumferentially arranged substantially in a torque transmitting plane between the driving and driven members with their adjacent sides rockingly contacting each other for transmitting torque from the driving captive rockers through the floating rockers to the driven captive rockers.

3. A rotary torque transmitting joint for transmitting high torque at substantially constant angular velocity between a driving member rotating about an axis and an adjacent driven member rotating about an axis which intersects the axis of rotation of the driving member comprising, a plurality of substantially equally radially spaced torque transmitting rockers circumferentially arranged substantially in a torque transmitting plane between the driving and driven members and having their adjacent sides rockingly contacting each other, means securing a first group of said rockers in circumferentially spaced apart relation to the driving member to form driving captive rockers, means securing a second group of said rockers in circumferentially spaced apart relation to the driven member to form driven captive rockers, the remainder of said rockers forming a third group of floating rockers which are individually arranged between the respective driving and driven captive rockers for transmitting torque from the former to the latter, said rockers rockingly contacting each other along lines of contact radiating from the point of intersection of the axes of rotation of the driving and driven members.

4. A rotary torque transmitting joint for transmitting high torque at substantially constant angular velocity between a driving member rotating about an axis and an adjacent driven member rotating about an axis which intersects the axis of rotation of the driving member comprising, a first group of rockers secured in circumferentially spaced apart relation to the driving member and forming driving captive rockers, a second group of rockers secured in circumferentially spaced apart relation to the driven member and forming driven captive rockers, a third group of rockers arranged in circumferentially spaced apart relation and interposed between the first and second groups of rockers and forming floating rockers, all of said rockers being substantially equally radially spaced and circumferentially arranged substantially in a torque transmitting plane between the driving and driven members with their adjacent sides rockingly contacting each other for transmitting torque from the driving captive rockers through the floating rockers to the driven captive rockers, said rockers rockingly contacting each other along lines of contact radiating from the point of intersection of the axes of rotation of the driving and driven members.

5. A rotary torque transmitting joint for transmitting high torque at substantially constant angular velocity between a driving member rotating about an axis and an adjacent driven member rotating about an axis which intersects the axis of rotation of the driving member comprising, a plurality of substantially equally radially spaced torque transmitting rockers circumferentially arranged substantially in a torque transmitting plane between the driving and driven members and having their adjacent sides rockingly contacting each other, means securing a first group of said rockers in circumferentially spaced apart relation to the driving member to form driving captive rockers, means securing a second group of said rockers in circumferentially spaced apart relation to the driven member to form driven captive rockers, the remainder of said rockers forming a third group of floating rockers which are individually arranged between the respective driving and driven captive rockers for transmitting torque from the former to the latter, and intermeshing means on said captive and floating rockers for maintaining said rockers in rocking contact.

6. A rotary torque transmitting joint for transmitting high torque at substantially constant angular velocity between a driving member rotating about an axis and an adjacent driven member rotating about an axis which intersects the axis of rotation of the driving member comprising, a first group of rockers secured in circumferentially spaced apart relation to the driving member and forming driving captive rockers, a second group of rockers secured in circumferentially spaced apart relation to the driven member and forming driven captive rockers, a third group of rockers arranged in circumferentially spaced apart relation and interposed between the first and second groups of rockers and forming floating rockers, all of said rockers being substantially equally radially spaced and circumferentially arranged substantially in a torque transmitting plane between the driving and driven members with their adjacent sides rockingly contacting each other for transmitting torque from the driving captive rockers through the floating rockers to the driven captive rockers, and intermeshing means on said captive and floating rockers for maintaining said rockers in rocking contact.

7. A rotary torque transmitting joint for transmitting high torque at substantially constant angular velocity between a driving member rotating about an axis and an adjacent driven member rotating about an axis which intersects the axis of rotation of the driving member comprising, a plurality of substantially equally radially spaced torque transmitting rockers circumferentially arranged substantially in a torque transmitting plane between the driving and driven members and having their adjacent sides rockingly contacting each other, means securing a first group of said rockers in circumferentially spaced apart relation to the driving member to form driving captive rockers, means securing a second group of said rockers in circumferentially spaced apart relation to the driven member to form driven captive rockers, the remainder of said rockers forming a third group of floating rockers which are individually arranged between the respective driving and driven captive rockers for transmitting torque from the former to the latter, and means for preventing radial displacement of the floating rockers with respect to the captive rockers.

8. A rotary torque transmitting joint for transmitting high torque at substantially constant angular velocity between a driving member rotating about an axis and an adjacent driven member rotating about an axis which intersects the axis of rotation of the driving member comprising, a first group of rockers secured in circumferentially spaced apart relation to the driving member and forming driving captive rockers, a second group of rockers secured in circumferentially spaced apart relation to the driven member and forming driven captive rockers, a third group of rockers arranged in circumferentially spaced apart relation and interposed between the first and second groups of rockers and forming floating rockers, all of said rockers being substantially equally radially spaced and circumferentially arranged substantially in a torque transmitting plane between the driving and driven members with their adjacent sides rockingly contacting each other for transmitting torque from the driving captive rockers through the floating rockers to the driven captive rockers, and means for preventing radial displacement of the floating rockers with respect to the captive rockers.

9. A rotary torque transmitting joint for transmitting high torque at substantially constant angular velocity between a driving member rotating about an axis and an adjacent driven member rotating about an axis which intersects the axis of rotation of the driving member comprising, a plurality of substantially equally radially spaced torque transmitting rockers circumferentially arranged substantially in a torque transmitting plane between the driving and driven members and having their adjacent sides rockingly contacting each other, means securing a first group of said rockers in circumferentially spaced apart relation to the driving member to form driving captive rockers, means securing a second group of said rockers in circumferentially spaced apart relation to the driven member to form driven captive rockers, the remainder of said rockers forming a third group of floating rockers which are individually arranged between the respective driving and driven captive rockers for transmitting torque from the former to the latter, and intermeshing means on said captive and floating rockers for preventing radial displacement of the floating rockers with respect to the captive rockers and for maintaining said rockers in rocking contact.

10. A rotary torque transmitting joint for transmitting high torque at substantially constant angular velocity between a driving member rotating about an axis and an adjacent driven member rotating about an axis which intersects the axis of rotation of the driving member comprising, a first group of rockers secured in circumferentially spaced apart relation to the driving member and forming driving captive rockers, a second group of rockers secured in circumferentially spaced apart relation to the driven member and forming driven captive rockers, a third group of rockers arranged in circumferentially spaced apart relation and interposed between the first and second groups of rockers and forming floating rockers, all of said rockers being substantially equally radially spaced and circumferentially arranged substantially in a torque transmitting plane between the driving and driven members with their adjacent sides rockingly contacting each other for transmitting torque from the driving captive rockers through the floating rockers to the driven captive rockers, and intermeshing means on said captive and floating rockers for preventing radial displacement of the floating rockers with respect to the captive rockers and for maintaining said rockers in rocking contact.

11. A rotary torque transmitting joint for transmitting high torque at substantially constant angular velocity between a driving member rotating about an axis and an adjacent driven member rotating about an axis which intersects the axis of rotation of the driving member comprising, a plurality of substantially equally radially spaced torque transmitting rockers circumferentially arranged substantially in a torque transmitting plane between the driving and driven members and having their adjacent sides rockingly contacting each other, means securing a first group of said rockers in circumferentially spaced apart relation to the driving member to form driving captive rockers, means securing a second group of said rockers in circumferentially spaced apart relation to the driven member to form driven captive rockers, the remainder of said rockers forming a third group of floating rockers which are individually arranged between the respective driving and driven captive rockers for transmitting torque from the former to the latter, at least some of said rockers being adjustable in their circumferential dimension for assuring rocking contact between all of the rockers.

12. A rotary torque transmitting joint for transmitting high torque at substantially constant angular velocity between a driving member rotating about an axis and an adjacent driven member rotating about an axis which intersects the axis of rotation of the driving member comprising, a first group of rockers secured in circumferentially spaced apart relation to the driving member and forming driving captive rockers, a second group of rockers secured in circumferentially spaced apart relation to the driven member and forming driven captive rockers, a third group of rockers arranged in circumferentially spaced apart relation and interposed between the first and second groups of rockers and forming floating rockers, all of said rockers being substantially equally radially spaced and circumferentially arranged substantially in a torque transmitting plane between the driving and driven members with their adjacent sides rockingly contacting each other for transmitting torque from the driving captive rockers through the floating rockers to the driven captive rockers, at least some of said rockers being adjustable in their circumferential dimension for assuring rocking contact between all of the rockers.

13. A rotary torque transmitting joint for transmitting high torque at substantially constant angular velocity between a driving member rotating about an axis and an adjacent driven member rotating about an axis which intersects the axis of rotation of the driving member comprising, a plurality of substantially equally radially spaced torque transmitting rockers circumferentially arranged substantially in a torque transmitting plane between the driving and driven members and having their adjacent sides rockingly contacting each other, means securing a first group of said rockers in circumferentially spaced apart relation to the driving member to form driving captive rockers, means securing a second group of said rockers in circumferentially spaced apart relation to the driven member to form driven captive rockers, the remainder of said rockers forming a third group of floating rockers which are individually arranged between the respective driving and driven captive rockers for transmitting torque from the former to the latter, the contacting sides of said rockers being apically tapered from the point of intersection of the axes of rotation of the driving and driven members and being contoured to provide at all times rocking contact therebetween along lines of contact radiating from said point of intersection.

14. A rotary torque transmitting joint for transmitting high torque at substantially constant angular velocity between a driving member rotating about an axis and an adjacent driven member rotating about an axis which intersects the axis of rotation of the driving member comprising, a first group of rockers secured in circumferentially spaced apart relation to the driving member and forming driving captive rockers, a second group of rockers secured in circumferentially spaced apart relation to the driven member and forming driven captive rockers, a third group of rockers arranged in circumferentially spaced apart relation and interposed between the first and second groups of rockers and forming floating rockers, all of said rockers being substantially equally radially spaced and circumferentially arranged substantially in a torque transmitting plane between the driving and driven members with their adjacent sides rockingly contacting each other for transmitting torque from the driving captive rockers through the floating rockers to the driven captive rockers, the contacting sides of said rockers being apically tapered from the point of intersection of the axes of rotation of the driving and driven members and being contoured to provide at all times rocking contact therebetween along lines of contact radiating from said point of intersection.

15. A rotary torque transmitting joint for transmitting high torque at substantially constant angular velocity between a driving member rotating about an axis and an adjacent driven member rotaing about an axis which intersects the axis of rotation of the driving member comprising, a plurality of substantially equally radially spaced torque transmitting rockers circumferentially arranged substantially in a torque transmitting plane between the driving and driven members and having their adjacent sides rockingly contacting each other, means securing a first group of said rockers in circumferentially spaced apart relation to the driving member to form driving captive rockers, means securing a second group of said rockers in circumferentially spaced apart relation to the driven member to form driven captive rockers, the remainder of said rockers forming a third group of floating rockers which are individually arranged between the respective driving and driven captive rockers for transmitting torque from the former to the latter, the contacting sides of said rockers being apically tapered from the point of intersection of the axes of rotation of the driving and driven members and being contoured to provide at all times rocking contact therebetween along lines of contact radiating from said point of intersection, and intermeshing means on said captive and floating rockers for preventing radial displacement of the floating rockers with respect to the captive rockers and for maintaining said rockers in rocking contact.

16. A rotary torque transmitting joint for transmitting high torque at substantially constant angular velocity between a driving member rotating about an axis and an adjacent driven member rotating about an axis which intersects the axis of rotation of the driving member comprising, a first group of rockers secured in circumferentially spaced apart relation to the driving member and forming driving captive rockers, a second group of rockers secured in circumferentially spaced apart relation to the driven member and forming driven captive rockers, a third group of rockers arranged in circumferentially spaced apart relation and interposed between the first and second groups of rockers and forming floating rockers, all of said rockers being substantially equally radially spaced and circumferentially arranged substantially in a torque transmitting plane between the driving and driven members with their adjacent sides rockingly contacting each other for transmitting torque from the driving captive rockers through the floating rockers to the driven captive rockers, the contacting sides of said rockers being apically tapered from the point of intersection of the axes of rotation of the driving and driven members and being contoured to provide at all times rocking contact therebetween along lines of contact radiating from said point of intersection, and intermeshing means on said captive and floating rockers for preventing radial displacement of the floating rockers with respect to the captive rockers and for maintaining said rockers in rocking contact.

17. A rotary torque transmitting joint for transmitting high torque at substantially constant angular velocity between a driving member rotating about an axis and an adjacent driven member rotating about an axis which intersects the axis of rotation of the driving member comprising, a plurality of substantially equally radially spaced torque transmitting rockers circumferentially arranged substantially in a torque transmitting plane between the driving and driven members and having their adjacent sides rockingly contacting each other, one fourth of said rockers being secured in circumferentially spaced apart relation to the driving member to form driving captive rockers, another fourth of said rockers being secured in circumferentially spaced apart relation to the driven member to form driven captive rockers, and the remaining half of said rockers being individually arranged between the driving and driven captive rockers to form floating rockers for transmitting torque from the driving captive rockers to the driven captive rockers.

18. A rotary torque transmitting joint for transmitting high torque at substantially constant angular velocity between a driving member rotataing about an axis and an adjacent driven member rotating about an axis which intersects the axis of rotation of the driving member comprising, a plurality of substantially equally radially spaced torque transmitting rockers circumferentially arranged substantially in a torque transmitting plane between the driving and driven members and having their adjacent sides rockingly contacting each other, one fourth of said rockers being secured in circumferentially spaced apart relation to the driving member to form driving captive rockers, another fourth of said rockers being secured in circumferentially spaced apart relation to the driven member to form driven captive rockers, and the remaining half of said rockers being individually arranged between the driving and driven captive rockers to form floating rockers for transmitting torque from the driving captive rockers to the driven captive rockers, said rockers rockingly contacting each other along lines of contact radiating from the point of intersection of the axes of rotation of the driving and driven members.

19. A rotary torque transmitting joint for transmitting high torque at substantially constant angular velocity between a driving member rotating about an axis and an adjacent driven member rotating about an axis which intersects the axis of rotation of the driving member comprising, a plurality of substantially equally radially spaced torque transmitting rockers circumferentially arranged substantially in a torque transmitting plane between the driving and driven members and having their adjacent sides rockingly contacting each other, one fourth of said rockers being secured in circumferentially spaced apart relation to the driving member to form driving captive rockers, another fourth of said rockers being secured in circumferentially spaced apart relation to the driven member to form driven captive rockers, and the remaining half of said rockers being individually arranged between the driving and driven captive rockers to form floating rockers for transmitting torque from the driving captive rockers to the driven captive rockers, and intermeshing means on said captive and floating rockers for preventing radial displacement of the floating rockers with respect to the captive rockers and for maintaining said rockers in rocking contact.

20. A rotary torque transmitting joint for transmitting high torque at substantially constant angular velocity between a driving member rotating about an axis and an adjacent driven member rotating about an axis which intersects the axis of rotation of the driving member comprising, a plurality of substantially equally radially spaced torque transmitting rockers circumferentially arranged substantially in a torque transmitting plane between the driving and driven members and having their adjacent sides rockingly contacting each other, one fourth of said rockers being secured in circumferentially spaced apart relation to the driving member to form driving captive rockers, another fourth of said rockers being secured in circumferentially spaced apart relation to the driven member to form driven captive rockers, and the remaining half of said rockers being individually arranged between the driving and driven captive rockers to form floating rockers for transmitting torque from the driving captive rockers to the driven captive rockers, the contacting sides of said rockers being apically tapered from the point of intersection of the axes of rotation of the driving and driven members and being contoured to provide at all times rocking contact therebetween along lines of contact radiating from said point of intersection.

References Cited in the file of this patent

UNITED STATES PATENTS

| | | |
|---|---|---|
| 1,626,270 | Craun | Apr. 26, 1927 |
| 2,236,633 | Wingquist | Apr. 1, 1941 |